J. C. HOWE.
SILENT CHAIN.
APPLICATION FILED NOV. 13, 1914.
1,201,736.
Patented Oct. 17, 1916.
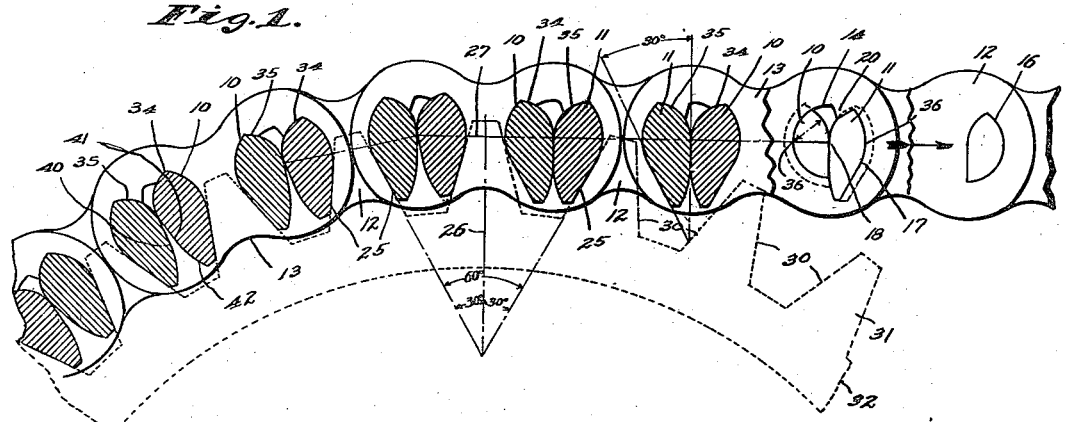
Fig. 1.
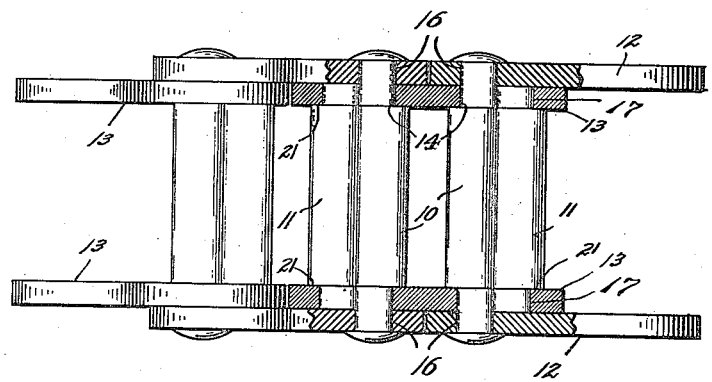
Fig. 2.
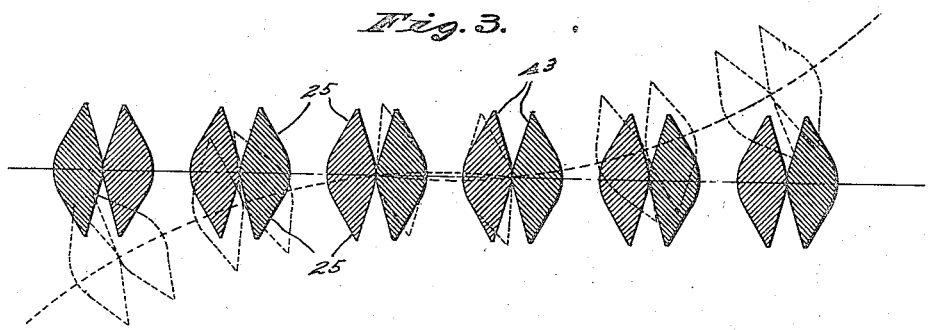
Fig. 3.
Fig. 4.  Fig. 5.
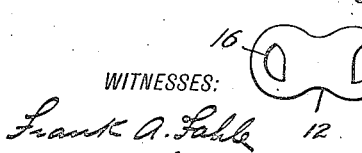 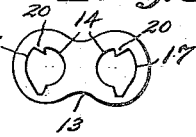
WITNESSES:
Frank A. Fahle
Josephine Gasper
INVENTOR
John C. Howe,
BY
Hood & Schley
ATTORNEYS

UNITED STATES PATENT OFFICE.

JOHN CLARK HOWE, OF INDIANAPOLIS, INDIANA.

SILENT CHAIN.

1,201,736.  Specification of Letters Patent.  Patented Oct. 17, 1916.

Application filed November 13, 1914. Serial No. 871,882.

*To all whom it may concern:*

Be it known that I, JOHN C. HOWE, a citizen of the United States, residing at Indianapolis, in the county of Marion and State of Indiana, have invented a new and useful Silent Chain, of which the following is a specification.

It is the object of my invention to provide a silent chain which shall have rolling bearing surfaces of maximum extent between successive links of the chain and maximum bearing surfaces between the chain and the associated sprocket wheel whereby the maximum amount of power can be transmitted with a minimum of friction; and to do this with a minimum number of parts.

In other words it is my object to avoid the necessity for the great number of interdigitated links usually found in silent chains, and at the same time to decrease the wear on and to increase the bearing surfaces of the chain over those present in the ordinary silent chains.

In carrying out my invention, I make each articulation of two parallel transverse members or cross bars which roll on each other, and which at the same time practically rotate relatively to each other substantially about an axis which is the pivotal axis between adjacent links, and provide these two cross bars with plane gripping surfaces for engaging the sprocket teeth of the associated sprocket wheel; and I rigidly connect the two farthest separated cross bars of each two adjacent articulations by one or more longitudinal connecting members. Usually I provide two of these longitudinal connecting members for each pair of cross bars thus interconnected, these two cross bars and two connecting members together forming a "link" of the chain, and to do this I permit one of the cross bars at each articulation to project through holes in the connecting members fixed to the other cross bar at such articulation, this cross bar fitting sufficiently closely in the hole to prevent back lash but being freely rotatable therein to the extent of the necessary angle of articulation.

The accompanying drawing illustrates my invention.

Figure 1 is a view showing a chain embodying my invention and associated with a sprocket wheel, the chain being partly in elevation and partly in section in several different planes; Fig. 2 is an enlarged plan view of a fragment shown in Fig. 1; Fig. 3 is a side elevation of the chain embodying my invention and articulable in either direction; and Figs. 4 and 5 are elevations of the two kinds of connecting members used in the chain shown in Fig. 1.

At each articulation of the chain, there are two parallel transverse members or cross bars 10 and 11. The corresponding or farthest removed cross bars 10 and 11 of each two adjacent articulations are rigidly interconnected by longitudinal connecting members or side bars 12 and 13 fixed to such cross bars, each pair of interconnecting cross bars and their connecting members forming a "link" of the chain, and the links 10—12 alternating in the chain with the links 11—13. The connecting members or side bars 12 and 13 extend from their associated cross bars 10 and 11 at each articulation past the cross bars 11 and 10 respectively of such articulation. The connecting members 12 are the outer members in the forms illustrated so that holes 14 must be provided in the inner connecting members 13 for permitting the cross bars 10 to pass freely through to the outer connecting members 12, the ends of the cross bars conveniently fitting tightly in holes 16 in the connecting members 12 and being riveted in place (as apparent from Fig. 2), and the ends of the cross bars 11 fitting tight in holes 17 in the connecting members 13. The holes 14 and 17 run into each other, in reality forming a single hole. The connecting surfaces of the cross bar 10 and the hole 14 are preferably circular cylindrical surfaces having a sliding fit one within the other and having as their common axis the axis 18 about which the two links substantially articulate, the hole 14 being of sufficiently greater angular extent than that part of the cross bar 10 which fits into it to allow the necessary sliding of the cross bar in the hole for obtaining the desired articulation. The shape of the engaging walls of the cross bar 10 and the hole 16 or of the cross bar 11 and the hole 17 is not particularly material, save that for firmness of gripping such engaging walls should not be wholly circular cylindrical and for convenience of manufacture they conform quite generally to the adjacent parts of the cross bars 10 and 11. An inward projection 20 helps to clamp the cross bar 11 in the hole 17, this projection also separating the holes 14 and 17 at one end. The cross bars 10 and 11 are both provided with shoulders 21 which bear against the inner faces of the connecting members 13 to help position the parts relatively to each other.

The cross bars 10 or 11 of any link have outwardly facing plane surfaces 25 which are at a fixed angle with each other and are each at half that angle to the line 26 erected perpendicular to and bisecting the line 27 joining the two axes of articulation between such link and the adjacent links. Conventionally, the first-named angle is 60° and the second 30°, as such are the ordinary angles used in silent chains. These plane surfaces coöperate with plane surfaces 30 on the teeth 31 of the associated sprocket wheel 32, the adjacent faces of each tooth and the second tooth from it forming this same angle of 60° so that a planar engagement between the cross bars 10 and 11 and the teeth of the sprocket wheel is obtained. This planar engagement extends the full length of the cross bars 10 and 11 between the connecting members 13, and these connecting members 13 project down along the sides of the teeth 31 so as to act as guides for the chain. Each cross bar 10 and 11 may have either one plane surface 25, as shown in Fig. 1, or two such surfaces, as shown in Fig. 3, according as the chain is to articulate in one or both directions, as in some cases a bending of the chain in both directions is necessary but more frequently a bending in one direction is all that is required.

The two cross bars 10 and 11 of each articulation have interengaging surfaces 34 and 35 respectively, which roll on each other as articulation takes place. These two surfaces 34 and 35 engage throughout the length of the cross bars 10 and 11. The shape of the surfaces 34 and 35 is such that as they roll on each other the two cross bars 10 and 11 as nearly as possible rotate relatively to each other about the desired axis of articulation 18. While strictly speaking this rotation is not accurately a true rotation about the axis 18, it is quite close to it for practical purposes for the small angle of articulation which is used in ordinary chains if the surfaces 34 and 35 are made as parts of circular cylindrical surfaces which each have a radius substantially equal to that of the engaging sliding surfaces of the cross bar 10 and the hole 14 and which each have an axis 36 on the line 27 at a distance equal to such radius in one direction or the other from the substantial axis of articulation 18. If the angle of articulation is unusually great, the radius used for the surfaces 34 and 35 may be somewhat less than just stated, the axis 36 for each surface still being on the line 27. The rolling surfaces 34 and 35 may extend only on the one side of the line 27, as shown in Fig. 1, or on both sides thereof, as shown in Fig. 3, according as the articulation is to be in one or both directions from a straight line. If these rolling surfaces extend only on one side of the line 27, the cross bars 10 and 11 may be provided with plane surfaces 40 and 41 tangent to the surfaces 34 and 35 at the line 27 to limit the articulation to one direction, the lower ends of these plane surfaces 40 and 41 being cut away, conveniently along curves 42, to allow the more ready escape of any dirt between such surfaces. The angle to which the articulation may extend need not be limited save by the size of the sprocket wheel, as illustrated in Fig. 1, but if desired it may be limited by plane surfaces 43 tangent to the surfaces 34 and 35 at points removed from the substantial axis of articulation 18 by the desired limiting angle of articulation, as illustrated in Fig. 3. This limiting of the angle of articulation is desirable in the doubly bending chain shown in Fig. 3, so as to make the surfaces 25 of sufficient length, as such surfaces would be cut off if the rolling surfaces 34 and 35 were continued to the extent in which they are shown in Fig. 1.

In practice, assuming that the chain shown in Fig. 1 is traveling in the direction shown by the arrow, the force is transmitted from one pair of connecting members 12 to the cross bar 10 at their hindmost ends, and from this cross bar 10 is transmitted to the cross bar 11 directly in front of it and forming with it a joint of articulation, and from this cross bar 11 to the two connecting members 13 extending rearwardly therefrom, and from these connecting members 13 to the cross bar 11 at their hindmost ends, and from this cross bar 11 to the cross bar 10 directly in front of it and forming with it a joint of articulation, and from this cross bar 10 to the two connecting members 12 extending rearwardly therefrom, and so on through the chain. The force is transmitted from the cross bars 10 or 11 to the associated connecting members 12 or 13 respectively by the connections between the latter and the ends of the cross bars, and as transmitted between the two cross bars 10 and 11 at each articulation by the interengaging rolling surfaces 34 and 35, the line of interengagement varying according to the angle of articulation which has been taken. The force is thus transmitted between associated cross bars 10 and 11, and also between such cross bars and the sprocket teeth with which they are in engagement, along the full length of such members and of the rolling surfaces 34 and 35 or the surfaces 25. Thus the full width of the sprocket is used for receiving the force from the chain, and the amount of force which can be transmitted is consequently greater than if the engagement of the chain with the sprocket wheels was along merely a plurality of portions of such width as is the case with the ordinary silent chain. In addition, because of the rolling of the cross bars 10 and 11 on each other the friction and wear at the joints of articulation are reduced to a minimum. Back lash between links is prevented by the engagement of the cross bars 10 in the holes 14.

I claim as my invention:

1. A silent chain comprising two parallel cross bars having a rolling engagement with each other at each joint of articulation, and connecting members each fixed to the two farthest removed cross bars at two adjacent joints of articulation, the interengaging rolling surfaces of the two cross bars being such that as they roll they also rotate relatively to each other approximately about an axis fixed relatively to them both, each of said cross bars having a plane surface for engagement with the tooth of a sprocket wheel.

2. A silent chain comprising two parallel cross bars having a rolling engagement with each other at each joint of articulation, and connecting members each fixed to the two farthest removed cross bars at two adjacent joints of articulation, each of said cross bars having a plane surface for engagement with the tooth of a sprocket wheel.

3. A silent chain comprising two parallel cross bars having a rolling engagement with each other at each joint of articulation, and connecting members each fixed to the two farthest removed cross bars at two adjacent joints of articulation, each of said cross bars having a plane surface for engagement with the tooth of a sprocket wheel, the two plane surfaces on the two cross bars which are interconnected by a connecting member being at a fixed angle to each other.

4. A silent chain comprising a plurality of links each of which comprises a longitudinal member and two cross bars, adjacent links over-lapping so that a cross bar of each of the adjacent links is located between the two cross bars of a link, and cross bars of adjacent links being parallel and engaging on convex cylindrical surfaces on both cross bars on which surfaces they roll relatively to each other as articulation occurs, the cross bars of each link being provided with plane surfaces for engaging the teeth of a sprocket wheel and the two plane surfaces on each link being at a fixed angle from each other.

5. A silent chain comprising a plurality of links each of which comprises a longitudinal member and two cross bars, adjacent links over-lapping so that a cross bar of each of the adjacent links is located between the two cross bars of a link, and cross bars of adjacent links being parallel and engaging on convex cylindrical surfaces on both cross bars on which surfaces they roll relatively to each other as articulation occurs, the cross bars of each link being provided with plane surfaces for engaging the teeth of a sprocket wheel.

6. A silent chain comprising a plurality of links each of which comprises a longitudinal member and two cross bars, adjacent links over-lapping so that a cross bar of each of the adjacent links is located between the two cross bars of a link, and cross bars of adjacent links being parallel and engaging on cylindrical surfaces, the cross bars of each link being provided with plane surfaces for engaging the teeth of a sprocket wheel.

7. A chain comprising a plurality of links each of which comprises a longitudinal member and two cross bars, adjacent links over-lapping so that a cross bar of each of the adjacent links is located between the two cross bars of a link, and cross bars of adjacent links being parallel and rollingly engaging on convex cylindrical surfaces, some of the longitudinal members being provided with guide holes and one of each pair of engaging cross bars having a sliding fit in one of such guide holes in a longitudinal member of the adjacent link so as to hold such two cross bars in rolling inter-engagement, and the cross bars having exposed portions which are out of the plane of the connecting members for co-operating with the teeth of a sprocket wheel.

8. A chain comprising a pair of cross bars having a rolling engagement with each other at each joint of articulation, and a pair of connecting members extending from each cross bar past the other cross bar to the far cross bar at the adjacent joint of articulation, the two cross bars at each joint of articulation being parallel and engaging each other on convex cylindrical surfaces on which they roll relatively to each other as articulation takes place, and each of said cross members having a plane engaging surface for engaging the tooth of a sprocket wheel across the full width of the latter.

9. A chain comprising a pair of cross bars having a rolling engagement with each other at each joint of articulation, and a pair of connecting members extending from each cross bar past the other cross bar to the far cross bar at the adjacent joint of articulation, the two cross bars at each joint of articulation being parallel and engaging each other on cylindrical surfaces, and each of said cross members having a plane engaging surface for engaging the tooth of a sprocket wheel across the full width of the latter.

10. A chain comprising a pair of cross bars having a rolling engagement with each other at each joint of articulation, and a pair of connecting members extending from each cross bar past the other cross bar to the far cross bar at the adjacent joint of articulation, the two cross bars at each joint of articulation being parallel and rollingly engaging each other on convex cylindrical surfaces, some of the connecting members being provided with guide holes and one of the cross bars at each joint of articulation having a sliding fit in such a guide hole in the connecting member which extends past it to the coöperating cross bar so that the two cross bars of the pair are held in rolling engagement with each other, and the cross bars having exposed intermediate portions which are between and out of the planes of the connecting members for coöperating with the teeth of a sprocket wheel.

11. A chain comprising two parallel cross bars having a rolling engagement with each other at each joint of articulation, connecting members each fixed to the two farthest removed cross bars at two adjacent joints of articulation, the interengaging rolling surfaces of the two cross bars both being cylindrically convex and being such that as they roll they also rotate relatively to each other approximately about an axis fixed relatively to them both, some of the connecting members being provided with guide holes and one of the cross bars at each joint of articulation having a sliding fit in such a guide hole in a connecting member which is fixed to the coöperating cross bar so that the two cross bars at such joint of articulation are held in rolling engagement with each other, and the cross bars having exposed portions which are out of the plane of the connecting members for coöperating with the teeth of a sprocket wheel.

12. A chain comprising two parallel cross bars having a rolling engagement with each other at each joint of articulation, the interengaging rolling surfaces of the two cross bars both being cylindrically convex, connecting members each fixed to the two farthest removed cross bars at two adjacent joints of articulation, some of the connecting members being provided with guide holes and one of the cross bars at each joint of articulation having a sliding fit in such a guide hole in a connecting member which is fixed to the coöperating cross bar so that the two cross bars at such joint of articulation are held in rolling engagement with each other, and the cross bars having exposed portions which are out of the plane of the connecting members for coöperating with the teeth of a sprocket wheel.

13. A chain comprising a plurality of links each of which comprises a longitudinal member and two cross bars, adjacent links over-lapping so that a cross bar of each of the adjacent links is located between the two cross bars of a link, cross bars of adjacent links being parallel and engaging on convex cylindrical surfaces on both cross bars on which surfaces they roll relatively to each other as articulation occurs, some of the longitudinal members being provided with guide holes and one of each pair of coöperating cross bars having a sliding fit in such a guide hole in a longitudinal member of the adjacent link so that the two convex cylindrical surfaces on the cross bars are held in rolling engagement with each other, and the cross bars having exposed portions which are out of the plane of the connecting members for coöperating with the teeth of a sprocket wheel.

14. A chain comprising a pair of cross bars having a rolling engagement with each other at each joint of articulation, a pair of connecting members extending from each cross bar past the other cross bar to the far cross bar at the adjacent joint of articulation, the two cross bars at each joint of articulation being parallel and engaging each other on convex cylindrical surfaces on which they roll relatively to each other as articulation takes place, some of the connecting members being provided with guide holes and one of the cross bars at each joint of articulation having a sliding fit in such a guide hole in a connecting member of the adjacent link so that the two convex cylindrical surfaces on the two cross bars at each joint of articulation are held in rolling engagement with each other, and the cross bars having exposed intermediate portions which are between and out of the planes of the connecting members for coöperating with the teeth of a sprocket wheel.

15. A chain comprising a plurality of links each of which comprises a longitudinal member and two cross bars, adjacent links overlapping so that a cross bar of each of the adjacent links is located between the two cross bars of a link, and cross bars at overlapping ends of adjacent links being parallel and having a rolling engagement on each other so that they roll relatively to each other as articulation occurs, each cross bar being provided with a plane surface for engaging a tooth of a sprocket wheel.

16. A chain comprising a plurality of links each of which comprises a longitudinal member and two cross bars, adjacent links overlapping so that a cross bar of each of the adjacent links is located between the two cross bars of a link, and each cross bar being provided with a plane surface for engaging a tooth of a sprocket wheel.

17. A chain comprising a plurality of links each of which comprises a longitudinal member and two cross bars, adjacent links overlapping so that a cross bar of each of the adjacent links is located between the two cross bars of a link, and each cross bar being provided with a plane surface for engaging a tooth of a sprocket wheel and also provided with a bearing surface for transmitting forces from the link of which it forms part to the adjacent link.

18. A chain comprising a plurality of links each of which comprises two side bars and two cross bars, adjacent links overlapping so that a cross bar of each of the adjacent links is located between the two cross bars of a link, each cross bar being provided with a plane surface for engaging a tooth of a sprocket wheel, and the links being alternately wide and narrow, the cross bars of the wide links projecting through the side bars of the narrow links.

19. A chain comprising a plurality of links each of which comprises two side bars and two cross bars, adjacent links overlapping so that a cross bar of each of the adjacent links is located between the two cross bars of a link, each cross bar being provided with a plane surface for engaging a tooth of a sprocket wheel and also provided with a bearing surface for transmitting forces from the link of which it forms part to the adjacent link, and the links being alternately wide and narrow, the cross bars of the wide links projecting through the side bars of the narrow links.

In witness whereof, I have hereunto set my hand at Indianapolis, Indiana, this 11th day of November, A. D. one thousand nine hundred and fourteen.

JOHN CLARK HOWE.

Witnesses:
FRANK A. FAHLE,
JOSEPHINE GASPER.